(12) United States Patent
Shindo et al.

(10) Patent No.: US 7,434,608 B2
(45) Date of Patent: Oct. 14, 2008

(54) AIR-BLOWING UNIT

(75) Inventors: Tomohide Shindo, Kariya (JP);
Takahiro Tokunaga, Kariya (JP)

(73) Assignee: Denso Corporation, Kariya (JP)

( * ) Notice: Subject to any disclaimer, the term of this patent is extended or adjusted under 35 U.S.C. 154(b) by 610 days.

(21) Appl. No.: 10/959,031

(22) Filed: Oct. 5, 2004

(65) Prior Publication Data

US 2005/0072554 A1    Apr. 7, 2005

(30) Foreign Application Priority Data

Oct. 7, 2003   (JP)   ............................. 2003-348254

(51) Int. Cl.
*B60H 1/00*   (2006.01)

(52) U.S. Cl. ..................... 165/42; 165/41; 165/121; 165/122; 454/124; 454/161; 62/244

(58) Field of Classification Search .................. 165/41, 165/42, 43, 44, 120, 121, 122, 202; 454/127, 454/124, 161; 62/244
See application file for complete search history.

(56) References Cited

U.S. PATENT DOCUMENTS 2,096,901 A * 10/1937 Knecht ....................... 454/127
3,238,999 A * 3/1966 Nallinger ...................... 165/41
3,862,549 A * 1/1975 Fernandes ..................... 165/42
3,980,024 A * 9/1976 Futer ........................... 406/93
3,999,487 A * 12/1976 Valverde ................... 104/138.1
4,022,599 A * 5/1977 Wilson et al. .................. 62/244
4,184,792 A * 1/1980 Turnbo ......................... 406/51
4,392,760 A * 7/1983 Futer ........................... 406/88
4,903,581 A * 2/1990 Nilsson ....................... 454/124
5,046,327 A * 9/1991 Walker et al. ................. 62/244
5,253,590 A * 10/1993 Marusak .................. 104/138.1
5,979,540 A * 11/1999 Allison et al. ................. 165/41
6,675,871 B2 * 1/2004 Okano et al. .................. 165/41
7,159,651 B2 * 1/2007 Ito et al. ..................... 165/202

FOREIGN PATENT DOCUMENTS

JP   7-117064   12/1995

* cited by examiner

*Primary Examiner*—Ljiljana (Lil) V Ciric
(74) *Attorney, Agent, or Firm*—Harness, Dickey & Pierce, PLC (57) ABSTRACT

An air-blowing unit includes a blower unit including an irreversible fan, a first blower-side duct connected to an inlet port of the blower unit, a second blower-side duct connected to an air discharge port of the blower unit, a first air opening-side duct including a first air opening, a second air opening-side duct including a second air opening, and an air passage switching device disposed between the blower-side ducts and the air opening-side ducts. The air passage switching device switches air passage connection between the blower-side ducts and the air opening-side ducts.

30 Claims, 8 Drawing Sheets

AIR-BLOWING UNIT

PRIORITY STATEMENT

This U.S. nonprovisional application claims priority on Japanese Patent Application No. 2003-348254 filed on Oct. 7, 2003, the entire disclosure of which is incorporated herein by reference.

FIELD OF THE INVENTION

The present invention generally relates to an air-blowing unit.

BACKGROUND OF THE INVENTION

In conventional air-blowing units, a fan, which may be a component of the air blowing units, may be reversible and thus may be able to reverse rotational direction thereof. As such, the air-blowing units may reverse airflow direction between an air inlet opening thereof and an air outlet opening thereof. In conventional air-blowing units, since the structure of the reversible fan is less popular than that of irreversible fan, it is not easy to manufacture the air-blowing units.

SUMMARY OF THE INVENTION

Example embodiments of the present invention provide new air-blowing units which can switch or reverse airflow direction between an air inlet opening thereof and an air outlet opening thereof with a irreversible fan; and/or can switching an air passage connection between duct portions.

In an example embodiment, the present invention is directed to an air-blowing unit including an irreversible fan, and at least one duct upstream of the irreversible fan and at least one duct downstream of the irreversible fan. The unit further includes means for changing a direction of airflow in at least a portion of each of the at least two ducts.

In another example embodiment, the present invention is directed to an air-blowing unit including an irreversible fan, at least one duct upstream of the irreversible fan and at least one duct downstream of the irreversible fan. The unit further includes a device, adapted to change a direction of airflow in at least a portion of each of the at least two ducts.

In yet another example embodiment, the present invention is directed to an air-blowing unit including a unit, the unit including an irreversible fan, an air inlet port, and an air discharge port. The air-blowing unit further includes a first blower-side duct, one end of which is connected to said air inlet port; a second blower-side duct, one end of which is connected to said air discharge port; a first air opening-side duct including a first air opening at one end thereof, said first air opening leading to a space external the air-blowing unit; and a second air opening-side duct including a second air opening at one end thereof, said second air opening leading to said external space. Finally, an air passage switching device is included, disposed between the other end of said blower-side ducts and the other end of said air opening-side ducts. The air passage switching device is adapted to switch an air passage connection between said blower-side ducts and said air opening-side ducts.

In still a further example embodiment, the present invention is directed to an air-blowing unit for mounting inside a vehicle door. The unit includes at least one duct upstream of the irreversible fan and at least one duct downstream of the irreversible fan; a device, adapted to switch a direction of airflow in at least a portion of each of the at least two ducts; and an air-conditioning unit. In a cooling mode, air is sucked through at least one of the two ducts from a space external to the blower unit, cooled, and discharged relatively upward towards a window of the vehicle door. In a heating mode, air is sucked from a vicinity proximate the window, heated, and discharged relatively downward into the external space.

In still an even further example embodiment, the present invention is directed to an air-blowing unit for mounting inside a vehicle door. The unit includes at least one duct upstream of the irreversible fan and at least one duct downstream of the irreversible fan; means for switching a direction of airflow in at least a portion of each of the at least two ducts; and means for cooling and heating air. In a cooling mode, air is sucked through at least one of the two ducts from a space external to the blower unit, cooled, and discharged relatively upward towards a window of the vehicle door. In a heating mode, air is sucked from a vicinity proximate the window, heated, and discharged relatively downward into the external space.

BRIEF DESCRIPTION OF THE DRAWINGS

The present invention will be more readily apparent from the following detailed description of example embodiments when taken together with the accompanying drawings, in which.

DETAILED DESCRIPTION OF EXAMPLE EMBODIMENTS

Example embodiments of the present invention will be described hereinafter with reference to the accompanying drawings.

Figure 1:
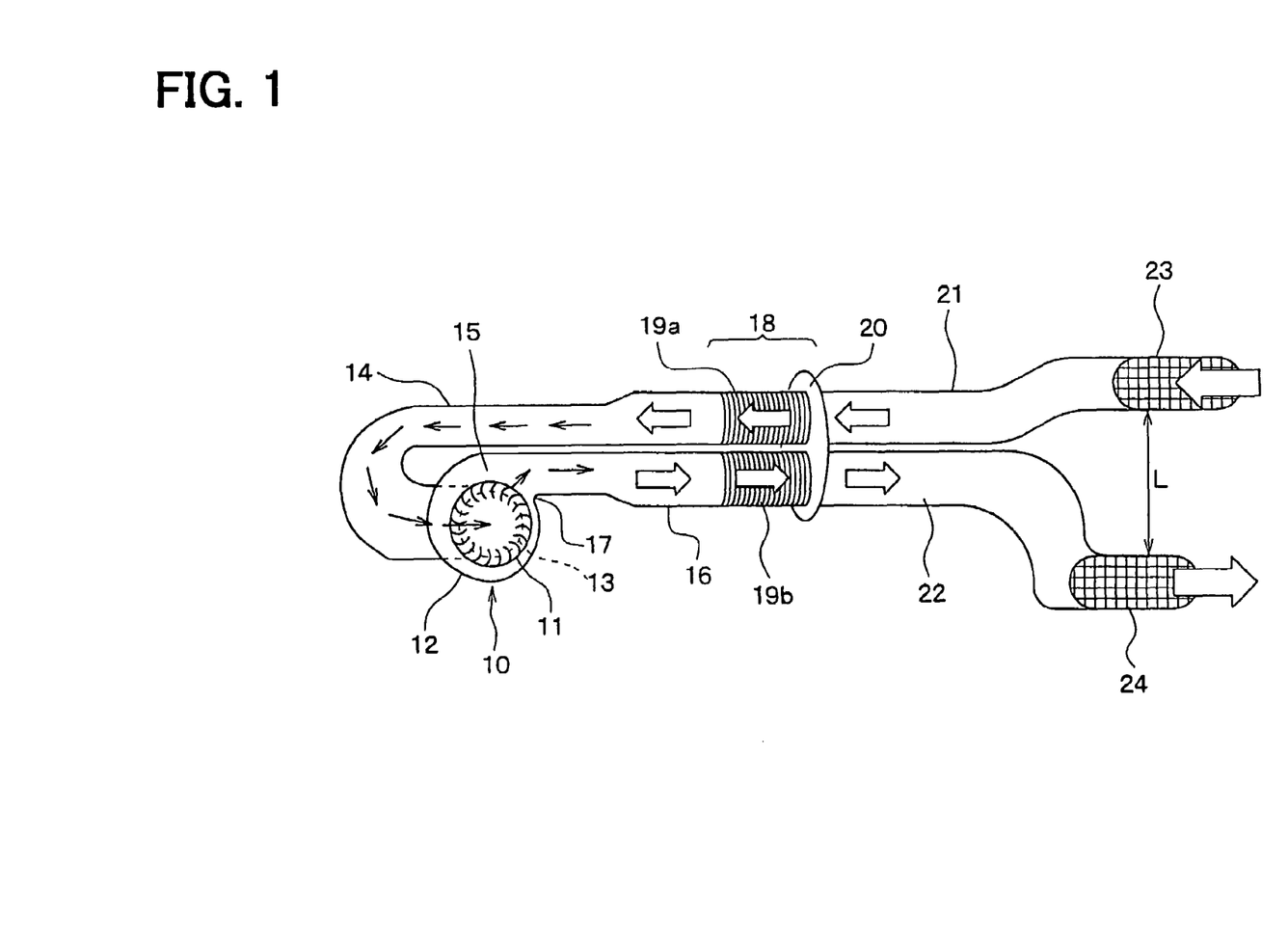
FIG. 1 illustrates a structure of an air-blowing unit in a first mode according to an example embodiment of the present invention.

FIG. 1 illustrates an air-blowing unit according to an example embodiment of the present invention. A blower unit 10 may include a fan 11, such as a centrifugal fan for example. The fan 11, which is formed as an irreversible fan, may suck air from an axial direction thereof and may discharge air in a radial direction thereof, and may include plural blades. Thus, the irreversible fan turns its blades in a single rotational direction and is thus a type of one-way fan for suck air from a single direction and discharging air in a single direction. The plural blades may be arranged in such a manner that the blades may form a circle on the whole. The fan 11 may be accommodated in a scroll casing 12 forming a scroll-shaped air passage therein. The fan 11 may be rotationally supported in the scroll casing 12 and may be rotated, for example by an electric motor (not shown).

An air inlet port 13 may be formed in the scroll casing 12 located in one side of the centrifugal fan 11 in an axial direction thereof, and one end of an air inlet duct 14 (blower-side duct or duct portion) may be connected to the air inlet port 13. An air discharge port 15 may be formed at a scroll-end side of the scroll casing 12, and one end of an air outlet duct 16 (blower-side duct or duct portion) may be connected to the air discharge port 15. A nose portion 17 may be formed in the scroll casing 12 in the vicinity of the air discharge port 15.

The other end of the air inlet duct 14 and the other end of the air outlet duct 16 may be connected to an air passage switching device 18. The air passage switching device 18 may include a first flexible duct 19a, a second flexible duct 19b, and a switching plate 20.

The first and the second flexible duct 19a and 19b may be formed of a deformable material, for example, resin or rubber, and the ducts 19a and 19b may be bellows shaped.

One end of the first flexible duct 19a may be fixed to the air inlet duct 14, and one end of the second flexible duct 19b may be fixed to the air outlet duct 16. The switching plate 20 may be formed of a rigid material, for example, resin, and may be circular in shape. The switching plate 20 may be provided with a first penetration aperture 20a and a second penetration aperture 20b (shown in FIG. 2). The penetration apertures 20a and 20b may pass completely through to the other side.

Figure 2:
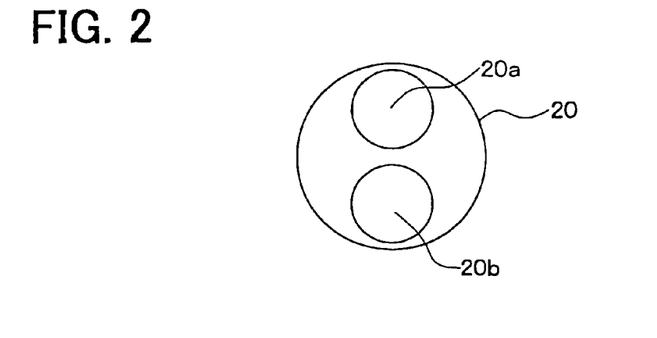
FIG. 2 illustrates an elevation view of a switching plate 20 according to an example embodiment of the present invention.

The other end of the first flexible duct 19a may be fixed to the first penetration aperture 20a, and the other end of the second flexible duct 19b may be fixed to the second penetration aperture 20b. The first flexible duct 19a and the second flexible duct 19b may be provided integrally with the switching plate 20. The switching plate 20, a movable member, may be rotated by a rotating device, for example, an electric motor, in such a manner that the other end of the first flexible duct 19a and the other end of the second flexible duct 19b may rotate respectively with the switching plate 20.

A first air opening 23 may be formed at one end of the first stationary duct 21 (air opening-side duct or duct portion). The first air opening 23 may act either as an air inlet opening from which air is sucked from a space external to the air-blowing unit 10 (including, but not limited to the interior of a car, the inside of a room, etc. for example); or as an air outlet opening from which air is discharged into the external space. Further, a second air opening 24 may be formed at one end of the second stationary duct 22 (air opening-side duct or duct portion). The second air opening 24 may also act either as an air outlet opening from which air is discharged into the external space; or as an air inlet opening from which air is sucked from the external space. The first air opening 23 and the second air opening 24 may be disposed in the external space or room with any distance of one another, as indicated by L in an up-and-down direction shown in FIG. 1.

The other end of the first stationary duct 21 and the other end of the second stationary duct 22 may respectively be in contact with the switching plate 20 on a side opposite to the flexible ducts 19a and 19b. Therefore, the switching plate 20 may rotate on the surface of the one end of the first and second stationary ducts (or duct portions) 21 and 22. Accordingly, relative position between the first flexible duct 19a and stationary duct 21 and relative position between the second flexible duct 19b and the stationary duct 22 may respectively be switched by rotating the switching plate 20. As such, the first and second stationary ducts or duct portions may be switched and thus may vary between inlet and outlet ducts or duct portions, switching between carrying air from an air opening and carrying air to an air opening. In this embodiment, elastic sealing members may further be provided with between the switching plate 20 and the first stationary duct 21, and also may be provided with between the switching plate 20 and the second stationary duct 22.

Next, a function of this example embodiment of FIG. 1 will be further explained.

FIG. 1 shows a first mode of the air blowing-unit where the air inlet duct 14 is connected to the first stationary duct 21 (through both the first flexible duct 19a and the switching plate 20), and the air outlet duct 16 is connected to the second stationary duct 22 (through both the second flexible duct 19b and the switching plate 20).

In the first mode, when the fan 11 is rotated, such as by the electric motor for example (not shown), air in the external space or room is sucked from the first air opening 23. The air then flows through the first stationary duct 21, the first penetration aperture 20a of the switching plate 20, the first flexible duct 19a, the air inlet duct 14, the fan 11, the air outlet duct 16, the second flexible duct 19b, the second penetration aperture 20b of the switching plate 20, and the second stationary duct 22 in this order. Then, the air is discharged into the room from the second air opening 24.

Figure 3:
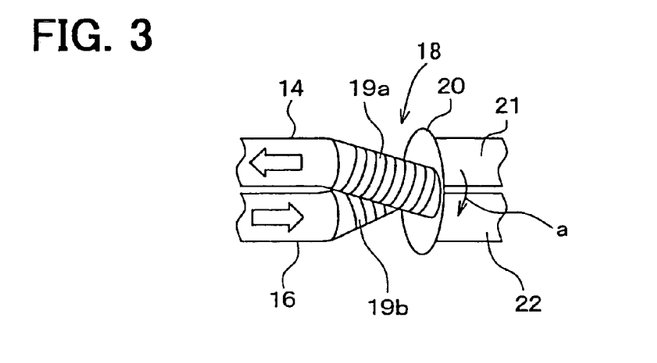
FIG. 3 illustrates an air passage switching device 18 switching between a first mode and a second mode according to an example embodiment of the present invention.

When the air passage switching device 18 switches from the first mode to a second mode, the switching plate 20 is rotated in a direction of an arrow "a" as shown in FIG. 3. Further, when the switching plate 20 rotates 180 degree relative to the first mode, the air passage switching device 18 is set in the second mode.

Figure 4:
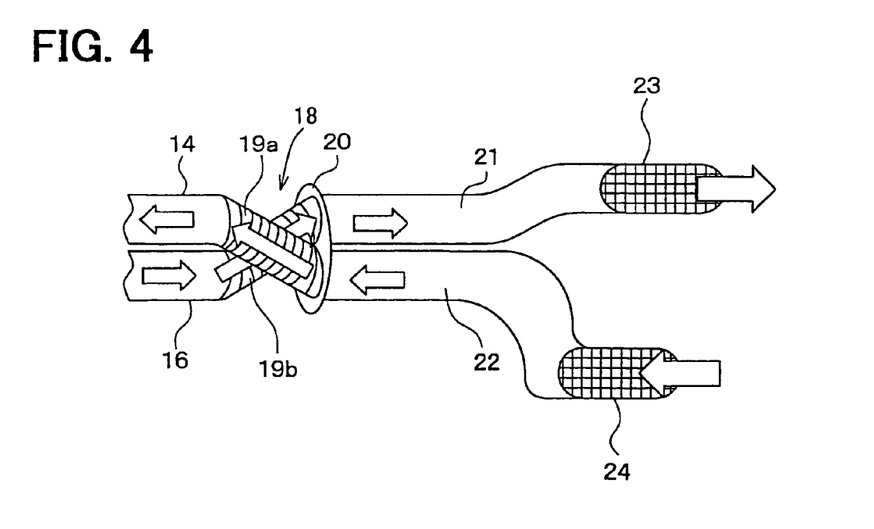
FIG. 4 illustrates an air passage switching device 18 in a second mode according to an example embodiment of the present invention.

In the second mode, shown in FIG. 4, when the fan 11 is rotated by the electric motor (not shown), air in the room is sucked from the second air opening 24, then the air flows through the second stationary duct 22, the first penetration aperture 20a of the switching plate 20, the first flexible duct 19a, the air inlet duct 14, the fan 11, the air outlet duct 16, the second flexible duct 19b, the second penetration aperture 20b of the switching plate 20, and the first stationary duct 21 in this order, and then the air is discharged into the room from the first air opening 23. Thus, in this exemplary embodiment, the duct portion 14 always acts as an air inlet duct and the duct portion 15 always acts as an air outlet duct. However, the duct portions 21 and 22 may be switched and may thus act either as an air inlet duct or an air outlet duct.

That is, the first air opening 23 may act as the air inlet opening from which air is sucked from the external space in the first mode, and may act as the air outlet opening from which air is discharged into the external space in the second mode. Further, the second air opening 24 may act as the air outlet opening from which air is discharged into the external space in the first mode, and may act as the air inlet opening from which air is sucked from the external space in the second mode.

In this embodiment, although the fan 11 of the air-blowing unit is formed as an irreversible fan, the air-blowing unit can reverse the position of the air inlet opening and that of the air outlet opening only by rotating the switching plate 20. Therefore, it is very easy to manufacture the air blowing-units.

According to example embodiments, the air passage switching device 18 may be configured in many different ways which achieve the same purpose of switching a direction of airflow in a portion two ducts. One such alternative embodiment can include a rotary duct 25 as shown in FIGS. 5-8C in place of the first flexible duct 19*a*, the second flexible duct 19*b*, and the switching plate 20.

Figure 5:
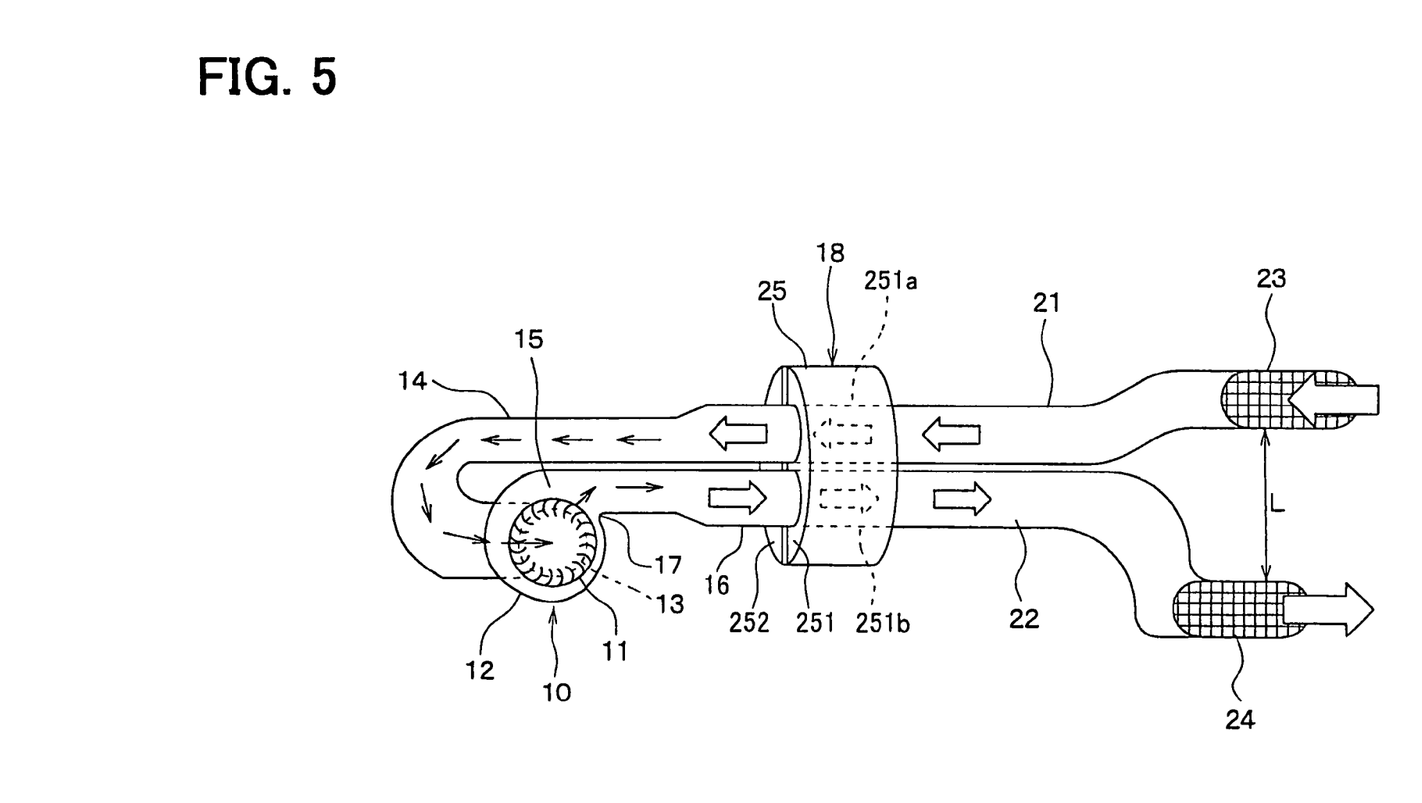
FIG. 5 illustrates a structure of an air-blowing unit in a first mode according to another example embodiment of the present invention.

The rotary duct 25 may be rotated by a rotating device, for example, an electric motor (not shown), and may be cylindrical. The rotary duct 25 may include a first semi-cylindrical portion 251 and a second semi-cylindrical portion 252.

The first semi-cylindrical portion 251 may include two air paths 251*a* and 251*b*. The air paths 251*a* and 251*b* may be arranged in such a manner that the air paths 251*a* and 251*b* may be straight respectively and parallel to each other (see FIGS. 5 and 8B) and may pass completely through to the other side respectively.

Further, the second semi-cylindrical portion 252 may also include two air paths 252*a* and 252*b*. The air paths 252*a* and 252*b* may be arranged in such a manner that the air paths 252*a* and 252*b* may cross with each other in an X shape (see FIGS. 7 and 8C) and may pass completely through to the other side respectively.

The other end of the air inlet duct 14 and the other end of the air outlet duct 16 may respectively be in contact with on one flat surface of the air passage switching device 18. Also, the other end of the first stationary duct 21 and the other end of the second stationary duct 22 may respectively be in contact with on the other flat surface of the air passage switching device 18.

Therefore, the air passage switching device 18 may rotate on both the other end of the air inlet duct 14 and the other end of the air outlet duct 16, and further, the air passage switching device 18 may rotate on both the other end of the first stationary duct 21 and the other end of the second stationary duct 22. Accordingly, relative position between the air inlet duct 14 and the air passage switching device 18 and relative position between the air outlet duct 16 and the air passage switching device 18 may respectively be switched by rotating the switching plate 20. Still further, relative position between the first stationary duct 21 and the air passage switching device 18 and relative position between the second stationary duct 22 and the air passage switching device 18 may respectively be switched by rotating the switching plate 20.

FIG. 5 shows a first mode of the air-blowing unit where the air inlet duct 14 is connected to the first stationary duct 21 through the air path 251*a* of the rotary duct 25, and the air outlet duct 16 is connected to the second stationary duct 22 through the air path 251*b* of the rotary duct 25.

In the first mode, when the fan 11 is rotated by the electric motor (not shown), air in the external space is sucked from the first air opening 23, then the air flows through the first stationary duct 21, the air path 251*a*, the air inlet duct 14, the fan 11, the air outlet duct 16, the air path 251*b*, and the second stationary duct 22 in this order. Then, the air is discharged into the external space from the second air opening 24.

Figure 6:
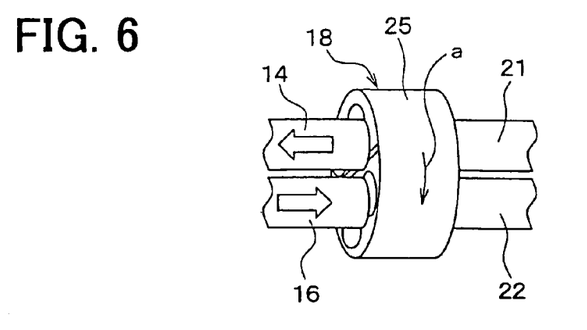
FIG. 6 illustrates an air passage switching device 18 switching between a first mode and a second mode according to another example embodiment of the present invention.

When the air passage switching device 18 switches from the first mode to the second mode, the rotary duct 25 rotates in a direction of an arrow "a" as shown in FIG. 6, and when the rotary duct 25 rotates 180 degree relative to the first mode, the air passage switching device 18 is set in the second mode.

Figure 7:
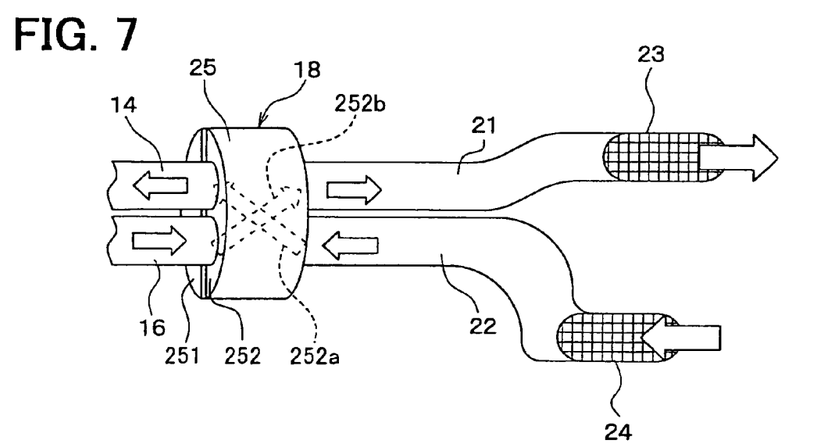
FIG. 7 illustrates an air passage switching device 18 in a second mode according to another example embodiment of the present invention.
Figure 8A:
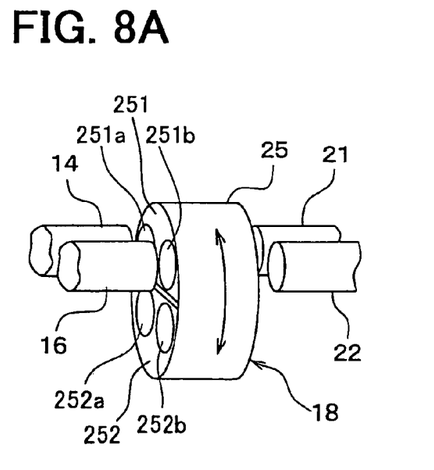
FIG. 8A illustrates an exploded view of an air passage switching device 18 and ducts according to another example embodiment of the present invention.
Figure 8B:
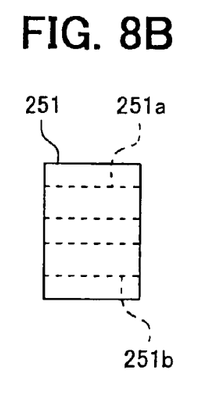
FIG. 8B illustrates an elevation view of one side of a rotary duct 25 according to another example embodiment of the present invention.
Figure 8C:
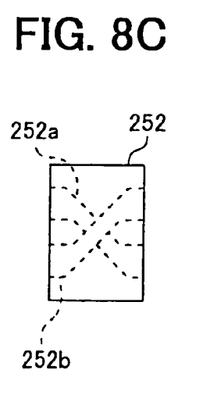
FIG. 8C illustrates an elevation view of an other side of a rotary duct 25 according to another example embodiment of the present invention.

In the second mode, shown in FIG. 7, when the fan 11 is rotated by the electric motor (not shown), air in the external space is sucked from the second air opening 24, then the air flows through the second stationary duct 22, the air path 252*a*, the air inlet duct 14, the fan 11, the air outlet duct 16, the air path 252*b*, and the first stationary duct 21 in this order. Then, the air is discharged into the room from the first air opening 23.

That is, the first air opening 23 may act as the air inlet opening from which air is sucked from the external space in the first mode, and may act as the air outlet opening from which air is discharged into the external space in the second mode. On the other hand, the second air opening 24 may act as the air outlet opening from which air is discharged into the external space in the first mode, and may act as the air inlet opening from which air is sucked from the external space in the second mode.

According to example embodiments described above, the air passage switching device 18 has been described as being circular or cylindrical. It should be understood that the shape of the air passage switching device 18 is not limited as such and can be of any shape which can be used to achieve the above-mentioned air passage switching functions.

Figure 9:
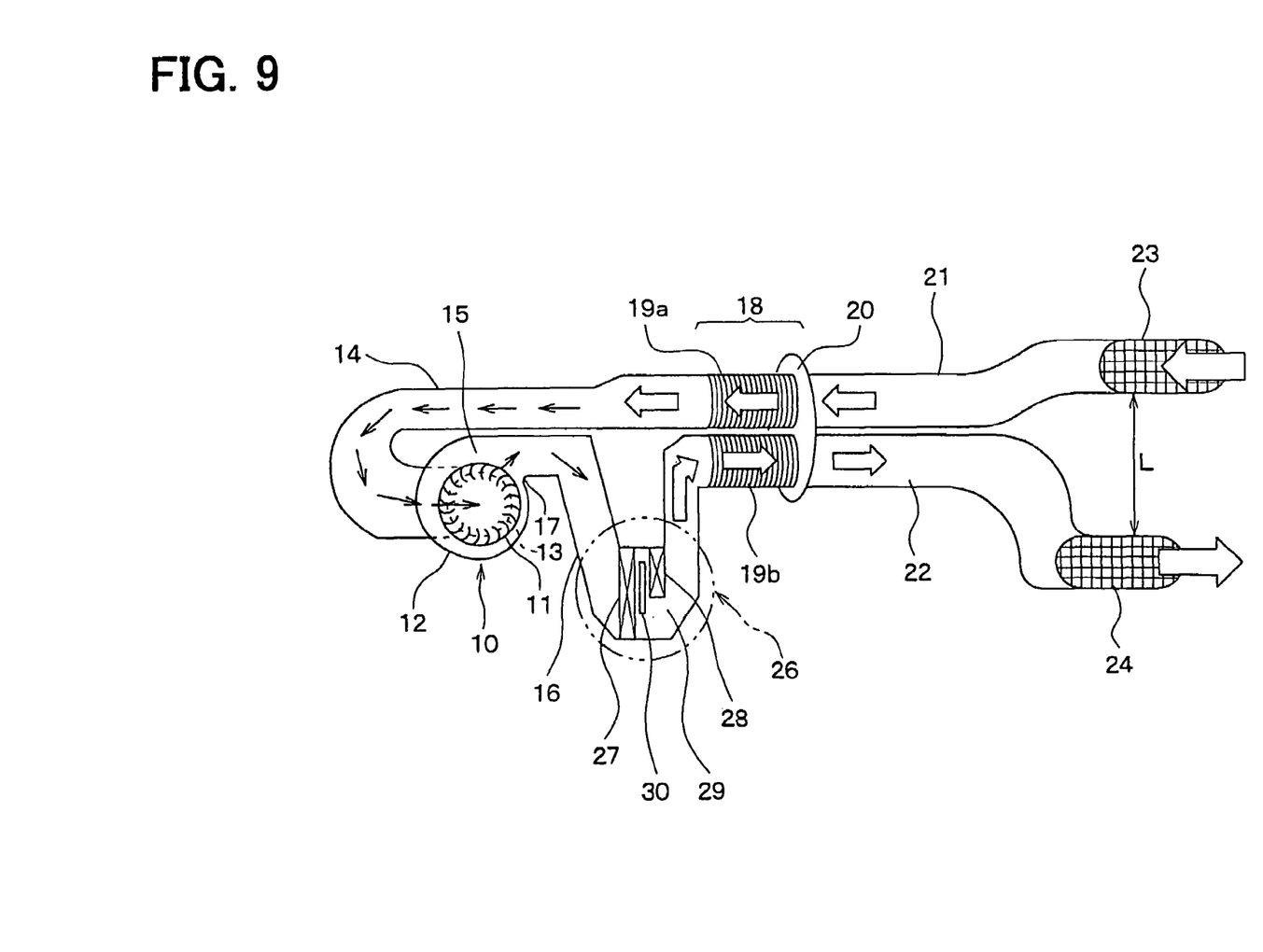
FIG. 9 illustrates a structure of an air-blowing unit in a first mode according to another example embodiment of the present invention.

Further, according to example embodiments described above, the air-blowing unit exercises an air-blowing function. However, as shown in FIG. 9, the air-blowing unit may exercise not only an air-blowing function, but also an air-conditioning function. It should be understood that this air-conditioning function can be applied to any of the aforementioned embodiments.

The air-conditioning unit 26 may be disposed in the air outlet duct 16, for example, and may include at least one of a cooling heat exchanger 27 and a heating heat exchanger 28.

The cooling heat exchanger 27 may be an evaporator which may be a low-pressure side heat exchanger of a vapor compression refrigeration cycle. The heating heat exchanger 28 may be disposed on a downstream air side of the cooling heat exchanger 27. The heating heat exchanger 28 may be a heater deriving heat from waste heat generated in a vehicle engine or the like. In one example embodiment, engine-cooling water may be a heat source of the heating heat exchanger 28.

The air-conditioning unit 26 may also include a bypass path 29 and an air-mixing door 30. The bypass path 29 may act as an air passage bypassing the heating heat exchanger 28. The air-mixing door 30 may be a sliding door sliding between a maximum cooling mode where the air-mixing door 30 fully closes the heating heat exchanger 28 and fully opens the bypass path 29, and a maximum heating mode where the air-mixing door 30 fully opens the heating heat exchanger 28 and fully closes the bypass path 29. The temperature of air discharged into the room may be controlled by adjusting the position of the air-mixing door 30.

In this embodiment, the air-blowing unit can reverse the position of the air inlet opening and that of the air outlet opening only by rotating the switching plate 20 (or rotary duct 25 as applied to the second embodiment). That is, when the air-conditioning unit 26 is, for example, in a cooling mode, the air blowing-unit may be set in the second mode. As a result, the second air opening 24 located lower position in the external space acts as the air inlet opening from which air is sucked from the external space, and the first air opening 23 located upper position in the external space acts as the air outlet opening from which air is discharged into the external space. Thus, the air, sucked from the external space and then cooled by the cooling heat exchanger 27, may be discharged toward upper half of the body of a person in the external space, and as a result, an air conditioning feeling for the person may be improved.

On the other hand, when the air-conditioning unit 26 is, for example, in a heating mode, the air blowing-unit may be set in the first mode. As a result, the first air opening 23 located upper position in the external space acts as the air inlet opening from which air is sucked from the external space, and the second air opening 24 located lower position in the external space acts as the air outlet opening from which air is discharged into the external space. Thus, the air, sucked from the external space and then heated by the heating heat exchanger 28, is discharged toward lower half of the body of a person in the external space, and as a result, air conditioning feeling for the person is improved.

Although the example embodiment shown in FIG. 9, the air-conditioning unit 26 is applied to the air-blowing unit shown in FIG. 1, the air-conditioning unit 26 may be applied to the air-blowing unit shown in FIG. 5, or an other alternative embodiments.

According to one of the example embodiments, the air-blowing unit with the air-conditioning unit 26 may be applied to a vehicle, for example to a door of a vehicle.

Figure 10:
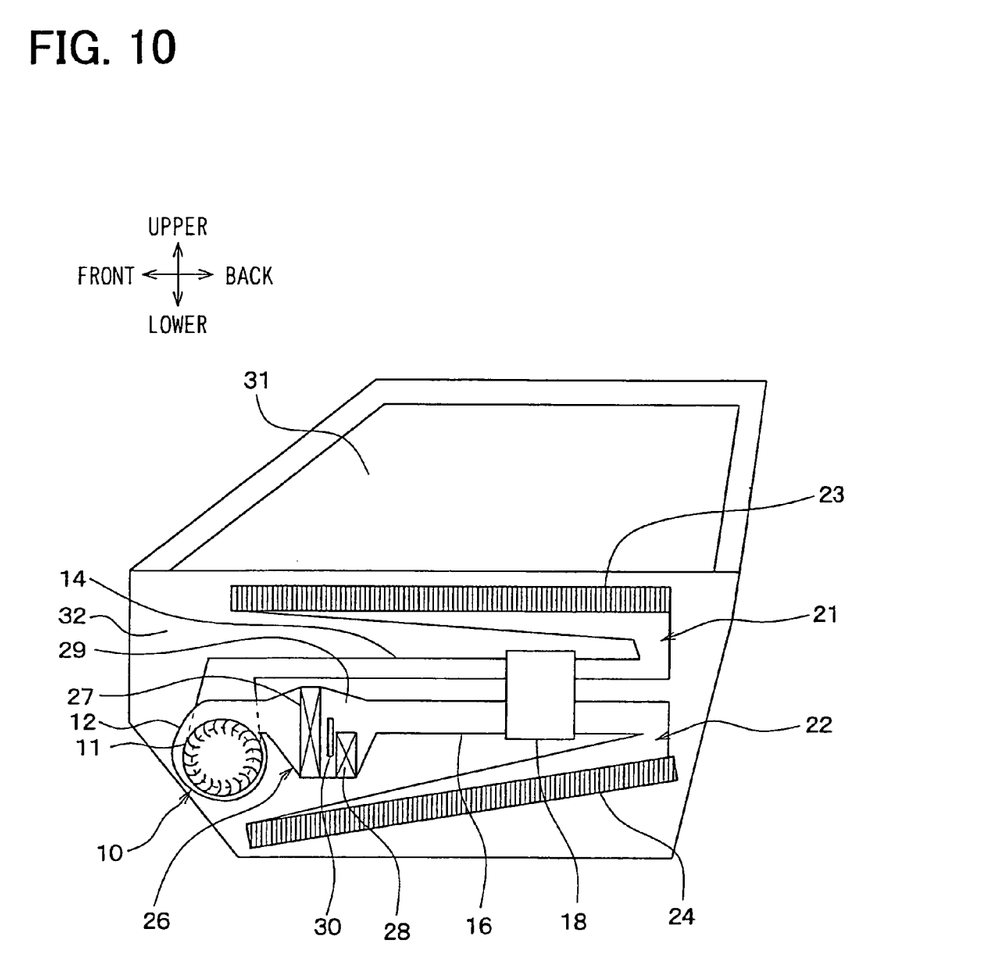
FIG. 10 illustrates a structure of an air-blowing unit applied to a vehicle according to another example embodiment of the present invention.

FIG. 10 illustrates a door of a vehicle. The door may include a window 31 and a door body 32. The air-blowing unit 26 may be disposed in the door body 32. The air passage switching device 18 may be comprised as any one of the embodiments described above.

The first air opening 23 may be disposed at a portion in the vicinity of a top end of the door body 32, and may extend backward and forward of the vehicle along the top end of the door body 32. On the other hand, the second air opening 24 may be disposed at a portion in the vicinity of a bottom end of the door body, and may incline backward and forward of the vehicle in such a manner that a front side end of the second air opening 24 may be lower than a back side end of the second air opening 24.

The air-blowing unit may be disposed between the first air opening 23 and the second air opening 24. The blower unit 10 and the air-conditioning unit 26 may be disposed in one side of the door body 32, for example, front side of the vehicle. The second air opening 24 may incline so as to avoid overlapping with the blower unit 10 and the air-conditioning unit 26.

Figure 11A:
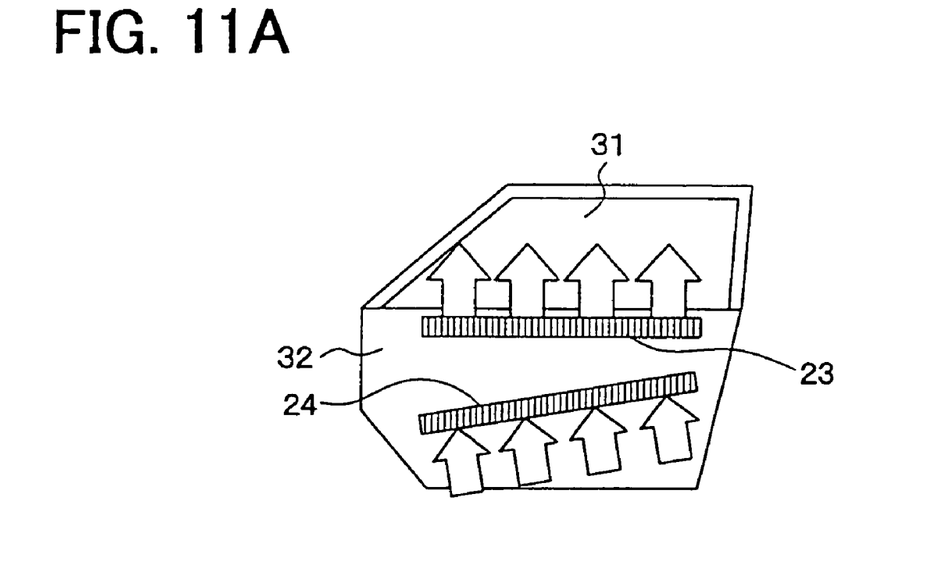
FIG. 11A illustrates an air-blowing unit in a second mode according to another example embodiment of the present invention.

In this example embodiment, when the air-conditioning unit 26 is, for example, in a cooling mode, the air blowing-unit is set in the second mode. As a result, shown in FIG. 11A, the second air opening 24 acts as the air inlet opening from which air is sucked from the external space, which may be in the vicinity of the knee of the passenger in the vehicle, for example. The first air opening 23 acts as the air outlet opening from which air is discharged upward along the window 31. Thus, the air, sucked from the second air opening 24 and then cooled by the cooling heat exchanger 27, is discharged upward along the window 31 from the first air opening 23. The air discharged upward along the window 31 acts like an air curtain and, as a result, the amount of sunlight through the window 31 is reduced.

Figure 11B:
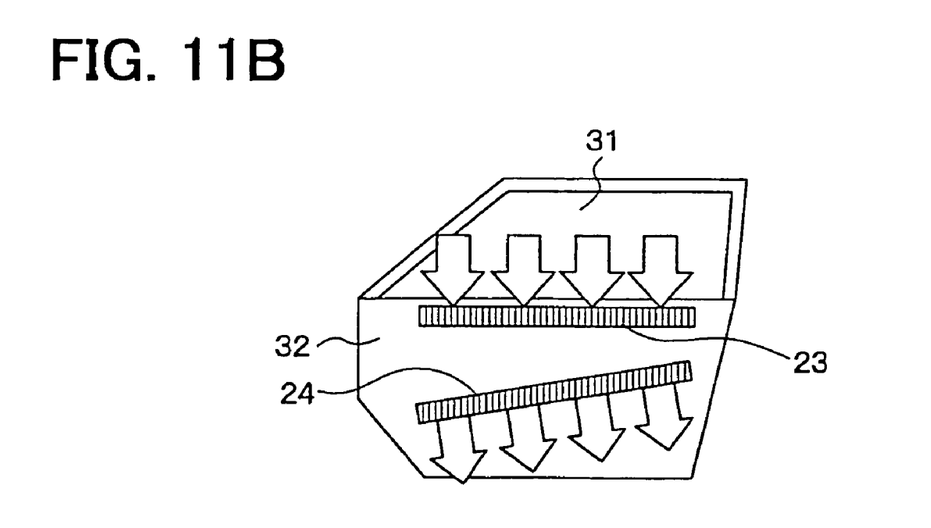
FIG. 11B illustrates an air-blowing unit in a first mode according to another example embodiment of the present invention.

On the other hand, when the air-conditioning unit 26 is, for example, in a heating mode, the air blowing-unit is set in the first mode. As a result, shown in FIG. 11B, the first air opening 23 acts as the air inlet opening from which air is sucked from the external space, in the vicinity of the window 31 for example, and the second air opening 24 acts as the air outlet opening from which air is discharged into the external space, toward the vicinity of the knee of the passenger for example. Thus, the air, sucked from the first air opening 23 and then heated by the heating heat exchanger 28, is discharged from the second air opening 24. In this example embodiment, since cool air cooled by the window 31 is sucked from the first air opening 23, the amount of the cool air cooled by the window 31 and then fallen toward feet of the passenger is reduced.

Figure 12:
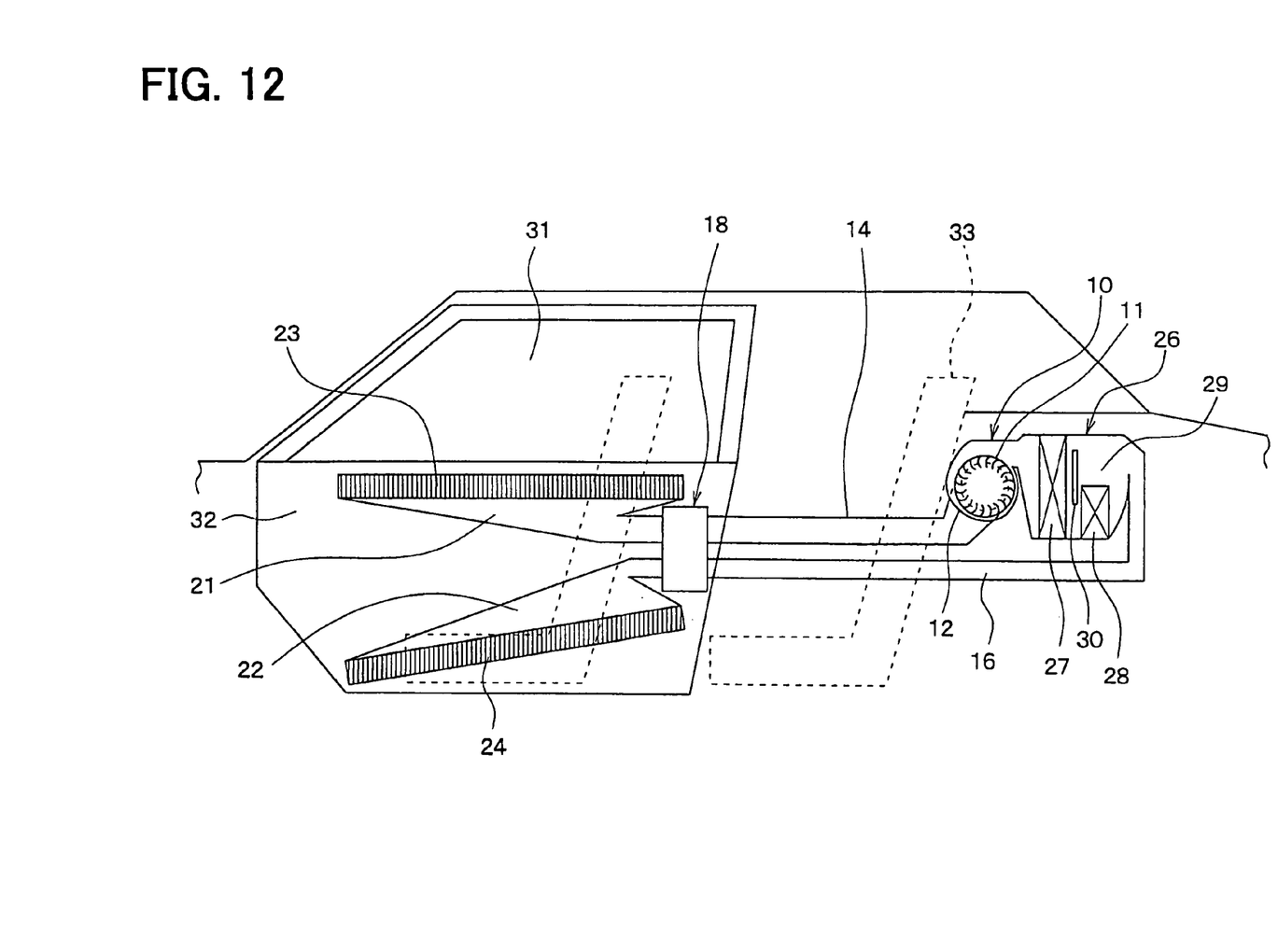
FIG. 12 illustrates a structure of an air-blowing unit according to another example embodiment of the present invention.

In the example embodiment shown in FIG. 10, although the blower unit 10 including the air-conditioning unit 26, may be disposed in the door body 32, the invention is not limited as such. These units may be disposed in other areas of the vehicle, such as areas external to the door body 32. For example, the blower unit 10 including the air-conditioning unit 26 may be disposed a portion behind a rear seat 33 as shown in FIG. 12. Also, the air inlet duct 14 and the air outlet duct 16 may be disposed both in the door body 32 and outside the door body 32, for example.

Therefore, it may be more convenient to dispose a structure which may not only be disconnected when the door body 32 opens but also be connected when the door body 32 closes.

According to the example embodiment shown in FIG. 12, although the air passage switching device 18 may be disposed in the door body 32, the air passage switching device 18 may be disposed outside the door body 32, for example, in a portion behind a rear seat 33, that is, a portion in the vicinity of the blower unit 10.

According to the example embodiments described above, the switching plate 20 may be disposed between a pair of the first flexible duct 19*a* and the second flexible duct 19*b* and a pair of the first stationary duct 21 and the second stationary duct 22. However, the switching plate 20 is not limited as such. For example, it may be disposed between a pair of the air inlet duct 14 and the air outlet duct 16 and a pair of the first flexible duct 19*a* and the second flexible duct 19*b*. In this case, the one end of the first flexible duct 19*a* may be fixed to the first penetration aperture 20*a* of the switching plate 20 and the one end of the second flexible duct 19*b* may be fixed to the second penetration aperture 20*b* of the switching plate 20. The first flexible duct 19*a* and the second flexible duct 19*b* may be provided integrally with the switching plate 20. Also, the other end of the first flexible duct 19*a* may be fixed to the other end of the first stationary duct 21, and the other end of the second flexible duct 19*b* may be fixed to the other end of the second stationary duct 22.

The switching plate 20 may be rotated by a rotating device, for example, an electric motor, in such a manner that the one end of the first flexible duct 19*a* and the one end of the second flexible duct 19*b* may rotate with the switching plate 20.

The other end of the air inlet duct 14 and the other end of the air outlet duct 16 may respectively be in contact with the switching plate 20 of opposite side to the flexible ducts 19*a* and 19*b*. That is, the switching plate 20 may rotate on the surface of the other end of the air inlet duct 14 and also on the other end of the air outlet duct 16.

According to the example embodiment shown in FIG. 5, although the first semi-cylindrical portion 251 and the second semi-cylindrical portion 252 may be disposed integrally, these portions 251 and 252 may further be disposed separately.

According to the example embodiments described above, the air-conditioning unit 26 may be disposed in the air outlet duct 16. However, the placement of the air conditioning unit 26 is not limited as such, and may be disposed in any other of the ducts.

According to the example embodiments described above, the air-conditioning unit 26 may include both the cooling heat exchanger 27 and the heating heat exchanger 28. However, either the cooling heat exchanger 27 or the heating heat exchanger 28 may be eliminated from the air-conditioning unit 26.

According to the example embodiments described above, the air-blowing unit may include the air-conditioning unit 26. However, an air-purifier, which may collect dusts and/or may deodorize and/or may remove harmful gas for example, may be disposed in place of, and/or in addition to the air conditioning unit 26.

Such variations are not to be regarded as departure from the spirit and scope of the example embodiments of the present invention, and all such modifications as would be obvious to one skilled in the art are intended to be included within the scope of the following claims.

What is claimed is:

1. An air-blowing unit comprising:
   a unit including an irreversible fan, an air inlet port, and an air discharge port;
   a first blower-side duct having a first end and an opposite second end, the first end of the first blower-side duct being connected to said air inlet port;
   a second blower-side duct having a first end and an opposite second end, the first end of the second blower-side duct being connected to said air discharge port;
   a first air opening-side duct having a first end and an opposite second end, a first air opening being disposed at the second end thereof, said first air opening leading to a space external to the air-blowing unit;
   a second air opening-side duct having a first end and an opposite second end, a second air opening being disposed at the second end thereof, said second air opening leading to said external space; and
   an air passage switching device disposed between the second ends of said blower-side ducts and the first ends of said air opening-side ducts, said air passage switching device being adapted to switch an air passage connection between said second ends of said blower-side ducts and said first ends of said air opening-side ducts; wherein
   said air passage switching device includes a first flexible duct and a second flexible duct, a first end of said first flexible duct being fixed to the second end of said first blower-side duct and a first end of said second flexible duct being fixed to the second end of said second blower-side duct, wherein said air passage switching device further includes a movable member, adapted to move the positions of a second end of said first flexible duct opposite to the first end of the flexible duct and a second end of said second flexible duct opposite to the first end of the flexible duct, and wherein,
   when said air passage switching device is switched to a first mode, said movable member moves to the position where the second end of said first flexible duct is matched with the first end of said first air opening-side duct, and the second end of said second flexible duct is matched with the first end of said second air opening-side duct, and
   when said air passage switching device is switched to a second mode, said movable member moves to the position where the second end of said first flexible duct is matched with the first end of said second air opening-side duct, and the second end of said second flexible duct is matched with the first end of said first air opening-side duct.

2. The air-blowing unit according to claim 1, wherein said movable member is a switching member rotatable by a rotating device in such a manner that the second end of said first flexible duct and the second end of said second flexible duct rotate respectively with said switching member, said switching member including a first penetration aperture and a second penetration aperture, said first penetration aperture and said second penetration aperture passing completely through to the other side of said switching member respectively, wherein the second end of said first flexible duct is fixed to said first penetration aperture, and the second end of said second flexible duct is fixed to said second penetration aperture, and wherein said switching member is adapted to rotate on the surface of the first end of said first air opening-side duct and on the surface of the first end of said second air opening-side duct.

3. The air-blowing unit according to claim 1, further comprising an air-conditioning unit including at least one heat exchanger.

4. The air-blowing unit according to claim 3, wherein said air-blowing unit is disposed in a door body of a vehicle.

5. The air-blowing unit according to claim 4, wherein said first air opening is disposed at an upper portion of said door body, and said second air opening is at a lower portion of said door body.

6. The air-blowing unit according to claim 5, wherein the air-conditioning unit includes a cooling heat exchanger and a heating heat exchanger.

7. The air-blowing unit according to claim 4, wherein the air-conditioning unit includes a cooling heat exchanger and a heating heat exchanger.

8. The air-blowing unit according to claim 3, wherein the air-conditioning unit includes a cooling heat exchanger and a heating heat exchanger.

9. The air-blowing unit according to claim 1, wherein said air-blowing unit is disposed in a door body of a vehicle.

10. The air-blowing unit according to claim 9, wherein said first air opening is disposed at an upper portion of said door body, and said second air opening is at a lower portion of said door body.

11. The air-blowing unit according to claim 1, wherein said air-conditioning unit is disposed outside said door body.

12. The air-blowing unit according to claim 11, wherein said air-conditioning unit is disposed at a position behind a rear seat of said vehicle.

13. The air-blowing unit according to claim 11, wherein said blower unit is disposed outside said door body.

14. The air-blowing unit according to claim 13, wherein said blower unit is disposed at a position behind a rear seat of said vehicle.

15. An air-blowing unit comprising:
   a unit including an irreversible fan, an air inlet port, and an air discharge port;
   a first blower-side duct having a first end and an opposite second end, the first end of the first blower-side duct being connected to said air inlet port;
   a second blower-side duct having a first end and an opposite second end, the first end of the second blower-side duct being connected to said air discharge port;
   a first air opening-side duct having a first end and an opposite second end, a first air opening being disposed at the second end thereof, said first air opening leading to a space external to the air-blowing unit;
   a second air opening-side duct having a first end and an opposite second end, a second air opening being disposed at the second end thereof, said second air opening leading to said external space; and an air passage switching device disposed between the second ends of said blower-side ducts and the first ends of said air opening-side ducts, said air passage switching device being adapted to switch an air passage connection between said second ends of said blower-side ducts and said first ends of said air opening-side ducts; wherein when said air passage switching device is switched to a first mode, the second end of said first blower-side duct is connected to the first end of said first air opening-side duct through said air passage switching device, and the second end of said second blower-side duct is connected to the first end of said second air opening-side duct through said air passage switching device, and when said air passage switching device is switched to a second mode, the second end of said first blower-side duct is connected to the first end of said second air opening-side duct through said air passage switching device, and the second end of said second blower-side duct is connected to the first end of said first air opening-side duct through said air passage switching device;

said air passage switching device includes a first flexible duct and a second flexible duct, a first end of said first flexible duct being fixed to the second end of said first blower-side duct and a first end of said second flexible duct being fixed to the second end of said second blower-side duct, wherein said air passage switching device further includes a movable member, adapted to move the positions of the second end of said first flexible duct and the second end of said second flexible duct, and wherein, when said air passage switching device is switched to said first mode, said movable member moves to the position where the second end of said first flexible duct is matched with the first end of said first air opening-side duct, and the second end of said second flexible duct is matched with the first end of said second air opening-side duct, and when said air passage switching device is switched to said second mode, said movable member moves to the position where the second end of said first flexible duct is matched with the first end of said second air opening-side duct, and the second end of said second flexible duct is matched with the first end of said first air opening-side duct.

16. The air-blowing unit according to claim 15, wherein said movable member is a switching member rotatable by a rotating device in such a manner that the second end of said first flexible duct and the second end of said second flexible duct rotate respectively with said switching member, said switching member including a first penetration aperture and a second penetration aperture, said first penetration aperture and said second penetration aperture passing completely through to the other side of said switching member respectively, wherein the second end of said first flexible duct is fixed to said first penetration aperture, and the second end of said second flexible duct is fixed to said second penetration aperture, and wherein said switching member is adapted to rotate on the surface of the first end of said first air opening-side duct and on the surface of the first end of said second air opening-side duct.

17. The air-blowing unit according to claim 15, further comprising an air-conditioning unit including at least one heat exchanger.

18. The air-blowing unit according to claim 17, wherein said air-blowing unit is disposed in a door body of a vehicle.

19. The air-blowing unit according to claim 18, wherein said first air opening is disposed at an upper portion of said door body, and said second air opening is at a lower portion of said door body.

20. The air-blowing unit according to claim 19, wherein the air-conditioning unit includes a cooling heat exchanger and a heating heat exchanger.

21. The air-blowing unit according to claim 18, wherein the air-conditioning unit includes a cooling heat exchanger and a heating heat exchanger.

22. The air-blowing unit according to claim 17, wherein the air-conditioning unit includes a cooling heat exchanger and a heating heat exchanger.

23. The air-blowing unit according to claim 15, wherein said air-blowing unit is disposed in a door body of a vehicle.

24. The air-blowing unit according to claim 23, wherein said first air opening is disposed at an upper portion of said door body, and said second air opening is at a lower portion of said door body.

25. An air-blowing unit comprising:

a unit including an irreversible fan, an air inlet port, and an air discharge port;

a first blower-side duct having a first end and an opposite second end, the first end of the first blower-side duct being connected to said air inlet port;

a second blower-side duct having a first end and an opposite second end, the first end of the second blower-side duct being connected to said air discharge port;

a first air opening-side duct having a first end and an opposite second end, a first air opening being disposed at the second end thereof, said first air opening leading to a space external to the air-blowing unit;

a second air opening-side duct having a first end and an opposite second end, a second air opening being disposed at the second end thereof, said second air opening leading to said external space; and an air passage switching device disposed between the second ends of said blower-side ducts and the first ends of said air opening-side ducts, said air passage switching device being adapted to switch an air passage connection between said second ends of said blower-side ducts and said first ends of said air opening-side ducts; wherein said air passage switching device includes a first flexible duct and a second flexible duct, a first end of said first flexible duct being fixed to the first end of said first air opening-side duct and a first end of said second flexible duct being fixed to the first end of said second air opening-side duct, wherein said air passage switching device further includes a movable member, adapted to move the positions of the second end of said first flexible duct and the second end of said second flexible duct, and wherein when said air passage switching device is switched to a first mode, said movable member moves to the position where the second end of said first flexible duct is matched with the second end of said first blower-side duct, and the second end of said second flexible duct is matched with the second end of said second blower-side duct, and when said air passage switching device is switched to a second mode, said movable member moves to the position where the second end of said first flexible duct is matched with the second end of said second blower-side duct, and the second end of said second flexible duct is matched with the second end of said first blower-side duct.

26. The air-blowing unit according to claim 25, wherein said movable member is a switching member, rotatable by a rotating device in such a manner that the second end of said first flexible duct and the second end of said second flexible duct rotate respectively with said switching member, wherein said switching member includes a first penetration aperture and a second penetration aperture, said first penetration aperture and said second penetration aperture pass completely through to the other side of said switching member respectively, wherein the second end of said first flexible duct is fixed to said first penetration aperture, and the second end of said second flexible duct is fixed to said second penetration aperture, and wherein said switching member is adapted to rotate on the surface of the second end of said first blower-side duct and on the surface of the second end of said second blower-side duct.

27. An air-blowing unit comprising:

a unit including an irreversible fan, an air inlet port, and an air discharge port;

a first blower-side duct having a first end and an opposite second end, the first end of the first blower-side duct being connected to said air inlet port;

a second blower-side duct having a first end and an opposite second end, the first end of the second blower-side duct being connected to said air discharge port;

a first air opening-side duct having a first end and an opposite second end, a first air opening being disposed at the second end thereof, said first air opening leading to a space external to the air-blowing unit;

a second air opening-side duct having a first end and an opposite second end, a second air opening being disposed at the second end thereof, said second air opening leading to said external space; and an air passage switching device disposed between the second ends of said blower-side ducts and the first ends of said air opening-side ducts, said air passage switching device being adapted to switch an air passage connection between said second ends of said blower-side ducts and said first ends of said air opening-side ducts; wherein when said air passage switching device is switched to a first mode, the second end of said first blower-side duct is connected to the first end of said first air opening-side duct through said air passage switching device, and the second end of said second blower-side duct is connected to the first end of said second air opening-side duct through said air passage switching device, and when said air passage switching device is switched to a second mode, the second end of said first blower-side duct is connected to the first end of said second air opening-side duct through said air passage switching device, and the second end of said second blower-side duct is connected to the first end of said first air opening-side duct through said air passage switching device; and said air passage switching device includes a first flexible duct and a second flexible duct, a first end of said first flexible duct being fixed to the first end of said first air opening-side duct, a first end of said second flexible duct being fixed to the first end of said second air opening-side duct, wherein said air passage switching device further includes a movable member, adapted to move the positions of the second end of said first flexible duct and the second end of said second flexible duct, and wherein, when said air passage switching device is switched to said first mode, said movable member moves to the position where the second end of said first flexible duct is matched with the second end of said first blower-side duct, and the second end of said second flexible duct is matched with the second end of said second blower-side duct, and when said air passage switching device is switched to said second mode, said movable member moves to the position where the second end of said first flexible duct is matched with the second end of said second blower-side duct, and the second end of said second flexible duct is matched with the second end of said first blower-side duct.

28. The air-blowing unit according to claim 27, wherein said movable member is a switching member, rotatable by a rotating device in such a manner that the second end of said first flexible duct and the second end of said second flexible duct rotate respectively with said switching member, wherein said switching member includes a first penetration aperture and a second penetration aperture, said first penetration aperture and second penetration aperture pass completely through to the other side of said switching member respectively, wherein the second end of said first flexible duct is fixed to said first penetration aperture, and the second end of said second flexible duct is fixed to said second penetration aperture, and wherein said switching member is rotatable on the surface of the second end of said first blower-side duct and on the surface of the second end of said second blower-side duct.

29. An air-blowing unit comprising:

a unit including an irreversible fan, an air inlet port, and an air discharge port;

a first blower-side duct having a first end and an opposite second end, the first end of the first blower-side duct being connected to said air inlet port;

a second blower-side duct having a first end and an opposite second end, the first end of the second blower-side duct being connected to said air discharge port;

a first air opening-side duct having a first end and an opposite second end, a first air opening being disposed at the second end thereof, said first air opening leading to a space external to the air-blowing unit;

a second air opening-side duct having a first end and an opposite second end, a second air opening being disposed at the second end thereof, said second air opening leading to said external space; and an air passage switching device disposed between the second ends of said blower-side ducts and the first ends of said air opening-side ducts, said air passage switching device being adapted to switch an air passage connection between said second ends of said blower-side ducts and said first ends of said air opening-side ducts; wherein when said air passage switching device is switched to a first mode, the second end of said first blower-side duct is connected to the first end of said first air opening-side duct through said air passage switching device, and the second end of said second blower-side duct is connected to the first end of said second air opening-side duct through said air passage switching device, and when said air passage switching device is switched to a second mode, the second end of said first blower-side duct is connected to the first end of said second air opening-side duct through said air passage switching device, and the second end of said second blower-side duct is connected to the first end of said first air opening-side duct through said air passage switching device; and said air passage switching device includes a first rotary duct portion and a second rotary duct portion, wherein said first rotary duct portion includes two air paths passing completely through to the other side of said first rotary duct portion respectively, wherein said second rotary duct portion includes two air paths passing completely through to the other side of said second rotary duct portion respectively, wherein said first rotary duct portion and said second rotary duct portion are respectively rotatable by a rotating device in such a manner that said first rotary duct portion is disposed between said blower-side ducts and said air opening-side ducts in said first mode, and said second rotary duct portion is disposed between said blower-side ducts and said air opening-side ducts in said second mode, wherein said two air paths of said first rotary duct portion are arranged in such a manner that said first blower-side duct is coupled to said first air opening-side duct through one air path, and second blower-side duct is coupled to said second air opening-side duct through the other air path, and wherein said two air paths of said second rotary duct portion are arranged in such a manner that said first blower-side duct is coupled to said second air opening-side duct through one air path, and second blower-side duct is coupled to said first air opening-side duct through the other air path.

30. The air-blowing unit according to claim 29, wherein said two air paths of said first rotary duct portion are arranged in such a manner that said two air paths are parallel to each other, and wherein said two air paths of said second rotary duct portion are arranged in such a manner that said two air paths cross each other.

* * * * *